(12) United States Patent
Bell et al.

(10) Patent No.: US 11,654,814 B2
(45) Date of Patent: May 23, 2023

(54) TRUCK TRAILER WITH DECK-LEVEL AND CURB-LEVEL UNLOADING CAPABILITY AND ADDITIONAL CUBIC CAPACITY

(71) Applicant: Strick Trailers, LLC, Fairless Hills, PA (US)

(72) Inventors: Justin Bell, New Haven, IN (US); Michael W. Palmer, Glenn Allen, VA (US)

(73) Assignee: Strick Trailers, LLC, Fairless Hills, PA (US)

( * ) Notice: Subject to any disclaimer, the term of this patent is extended or adjusted under 35 U.S.C. 154(b) by 154 days.

(21) Appl. No.: 17/181,186

(22) Filed: Feb. 22, 2021

(65) Prior Publication Data

US 2021/0261031 A1    Aug. 26, 2021

Related U.S. Application Data

(60) Provisional application No. 62/980,163, filed on Feb. 22, 2020.

(51) Int. Cl.
| | | |
|---|---|---|
| *B60P 1/02* | (2006.01) | |
| *B60P 7/15* | (2006.01) | |
| *B62D 25/20* | (2006.01) | |
| *B62D 33/04* | (2006.01) | |
| *B66F 7/10* | (2006.01) | |

(52) U.S. Cl.
CPC ............... *B60P 1/025* (2013.01); *B60P 7/15* (2013.01); *B62D 25/2054* (2013.01); *B62D 33/04* (2013.01); *B66F 7/10* (2013.01)

(58) Field of Classification Search
CPC ........ B60P 1/025; B60P 7/15; B62D 25/2054; B62D 33/04; B66F 7/10–20
See application file for complete search history.

(56) References Cited

U.S. PATENT DOCUMENTS

| | | | | |
|---|---|---|---|---|
| 3,051,335 A | | 8/1962 | Bartlett | |
| 3,516,706 A | * | 6/1970 | Bruce ................... | B60P 1/6445 |
| | | | | 296/182.1 |
| 4,010,826 A | * | 3/1977 | Jones ..................... | B60P 1/025 |
| | | | | 187/244 |
| 4,293,158 A | * | 10/1981 | Lewis .................... | B62D 33/04 |
| | | | | 119/412 |
| 5,092,721 A | * | 3/1992 | Prince .................... | B60P 1/02 |
| | | | | 414/679 |
| 5,112,082 A | * | 5/1992 | Clelland ................ | B62D 21/02 |
| | | | | 280/783 |
| 5,836,636 A | * | 11/1998 | Adams ............... | B65D 90/0053 |
| | | | | 414/679 |
| 10,414,413 B2 | * | 9/2019 | Huck .................... | B61D 3/005 |

(Continued)

*Primary Examiner* — Gregory A Blankenship
(74) *Attorney, Agent, or Firm* — George Pappas; Barrett McNagny LLP

(57) ABSTRACT

A trailer includes a front section having a first floor with an upper surface at a fixed vertical level approximately between three and six feet above a street level, a middle section, and a rear section having a second floor with an upper surface at the fixed vertical level. A horizontally-oriented platform is disposed in the middle section. A lifting mechanism is coupled to the platform and selectively raises and lowers the platform between a lower position of one to two feet above street level, otherwise known as curb-level, and an upper position of approximately between three and seven feet above street level.

20 Claims, 7 Drawing Sheets

(56) References Cited

U.S. PATENT DOCUMENTS

| | | | |
|---|---|---|---|
| 11,498,474 B2* | 11/2022 | Seitz | B60P 7/15 |
| 2003/0147734 A1* | 8/2003 | Adams | B60P 1/02 |
| | | | 414/541 |
| 2003/0206791 A1 | 11/2003 | Wroblewski | |
| 2006/0151229 A1* | 7/2006 | Leeve | B62D 33/04 |
| | | | 180/312 |
| 2015/0220591 A1* | 8/2015 | Eberlein | G06F 16/24 |
| | | | 707/736 |
| 2015/0232134 A1* | 8/2015 | Lavmand | B60P 1/02 |
| | | | 414/679 |
| 2016/0039474 A1* | 2/2016 | Murray | B62D 25/20 |
| | | | 296/37.16 |
| 2018/0022400 A1* | 1/2018 | Adams | B65G 67/20 |
| | | | 52/64 |
| 2018/0057081 A1* | 3/2018 | O'Marra | B62D 53/067 |
| 2019/0322206 A1* | 10/2019 | Lamy | B60P 3/14 |
| 2020/0180491 A1* | 6/2020 | Das | B62D 63/08 |
| 2021/0261031 A1* | 8/2021 | Bell | B62D 25/2054 |
| 2021/0261036 A1* | 8/2021 | Bell | B62D 33/04 |

* cited by examiner

TRUCK TRAILER WITH DECK-LEVEL AND CURB-LEVEL UNLOADING CAPABILITY AND ADDITIONAL CUBIC CAPACITY

CROSS-REFERENCED TO RELATED APPLICATIONS

This application claims benefit of U.S. Provisional Application No. 62/980,163 filed on Feb. 22, 2020, the disclosure of which is hereby incorporated by reference in its entirety for all purposes.

BACKGROUND

The present invention relates to a trailer, container, or other transport vehicle. Trailers typically have a floor that is ±49 inches above street level for unloading cargo onto a loading dock that is also at the same height. A problem is that cargo sometimes needs to be unloaded onto a curb that is less than one-foot above street level. Difficulty may be encountered in lowering the cargo from the ±49-inch-high trailer floor onto the curb below.

U.S. Pat. No. 3,051,335 (Bartlett) and U.S. Patent Pub. No. 20030206791 (Wroblewski) each disclose a trailer elevator wherein a floor section at the rear door may be lowered. A problem is that the trailer is not sealed when the floor section is lowered, and thus the floor must be raised while hauling cargo, which limits the volume of cargo that may be hauled.

Another problem is that the amount of cargo that can be transported/carried with a typical vehicle with a floor height of ±49 inches while maintaining the ability to be loadable/unloadable via forklift, clamp truck, pallet jack or other device is limited by the vertical reach of the device as the device is supported by the trailer floor.

SUMMARY

The present invention may include a trailer having a rear door providing access to a dock-level floor section that is ±49 inches above street level and a side door providing access to a platform from curb-level elevations. In-trailer elevator(s) may be provided such that the platform is movable between the curb-level position and a dock-level position in which the platform is co-planar with the dock-level floor section. When the platform is raised to the dock-level position, freight moving device such as a forklift, clamp truck, or pallet jack, may enter the rear door and drive on the platform to access another dock-level floor section that is at the front end of the trailer. The platform may be in the curb-level position during transport such that space is available from the ceiling all the way down to the curb-level platform for storing an increased volume of cargo.

The trailer may include a compartment ("belly") below the ±49-inch-high main floor of the trailer, between the trailer's landing gear and rear wheels, and extending down to curb height. Thus, the trailer has two different floor heights—a vertically moveable platform serves as a floor at curb level in the belly compartment, and a main floor at the standard ±49-inch loading dock height both in front of and behind the belly compartment. A door that also extends down to curb height may be in the sidewall of the trailer to enable unloading of cargo in the belly compartment onto a curb. The belly compartment is accessible from the main compartment of the trailer. Both the belly compartment and the main compartment are sealed from the outside ambient environment. The rear of the trailer also has a standard ±49 inch-high floor and rear door for loading and unloading onto a loading dock.

Conventional monocoque dry freight vans with standard industry recognized (±49 inch) floor heights can have different configurations. One such configuration may include standard industry recognized (±49 inch) floor heights fore and aft, with a deep center drop section of varying heights. Both the belly/center-drop section and the main compartment are sealed from the ambient environment. In an inventive embodiment, drop sections may have self-supporting, clear-span, vertical motion platforms that, in one configuration, can be utilized without restriction in standard, widely accepted freight carrying capacities; the secondary configuration, through the use of vertical lifting platforms, provides the flexibility of additional cargo carrying capacity with the ability to load and unload standard or bulky items through the standard height rear entry. Multiple lifting devices may be attached to single or multiple free-span, self-supporting platform(s). A platform may be vertically lowered into and raised out of the belly compartment of the trailer. The platform can be raised to the nominal main floor height. A locking mechanism may secure the platform, providing support at standard floor height for loading and unloading of the front compartment of the trailer with a freight moving device, such as a forklift, clamp truck, or pallet jack. The platform may be lowered to curb height in the belly compartment for supporting increased cargo during transport. Longitudinal and lateral stability may be controlled by frictional, magnetic, hydraulic, pneumatic, or mechanical means and utilize guides, rollers, slides, or other components. Actuation of the free-span platform may be electric, hydraulic, pneumatic, mechanical, or a combination thereof, which may integrate screws, opposing forces, liquids or gasses as methods or components providing motion.

In one embodiment, the invention includes individually-controllable, free-spanning, vertically actuated platforms implemented in a van trailer that, when loaded and actuated in a downward direction, provide additional cubic capacity within the trailer, and/or the ability to take freight from the standard ±49" dock/floor height to the lower levels, enabling curb height deliveries out of the side of the trailer.

The invention comprises, in one form thereof, a trailer including a front section having a first floor with an upper surface at a fixed vertical level approximately between three and six feet above a street level, a middle section, and a rear section having a second floor with an upper surface at the fixed vertical level. A horizontally-oriented platform is disposed in the middle section. A lifting mechanism is coupled to the platform and selectively raises and lowers the platform between a lower position of one to two feet above street level, otherwise known as curb-level, and an upper position of approximately between three and seven feet above street level.

The invention comprises, in another form thereof, a trailer including a front section having a first floor with an upper surface at a first vertical level approximately between three and six feet above a street level, a middle section, and a rear section having a second floor with an upper surface at the first vertical level approximately between three and six feet above a street level. A plurality of horizontally-oriented platforms are disposed in the middle section. A plurality of lifting mechanisms, each said lifting mechanism being coupled to a respective one of the platforms and configured to selectively raise and lower the respective platform between a lower position of one to two feet above street level, otherwise known as curb-level, and an upper position of approximately between three and seven feet above street level.

The invention comprises, in yet another form thereof, a trailer including a front section having a first floor with an upper surface approximately at a fixed vertical level between three and six feet above a street level, a middle section, and a rear section having a second floor with an upper surface at the fixed vertical level approximately between three and six feet above a street level. A plurality of horizontally-oriented platforms are disposed in the middle section. A plurality of lifting mechanisms is each coupled to a respective one of the platforms and selectively raises and lowers the respective platform between a lower position of one to two feet above street level, otherwise known as curb-level, and an upper position of approximately between three and seven feet above street level.

An advantage of the present invention is that cargo may be unloaded at either a forty-nine-inch height or at curb level, without secondary devices such as liftgates, forklifts, clamp trucks, pallet jacks and other.

Another advantage of the present invention is that additional cargo storage space may be provided in the trailer below the forty-nine-inch vertical level. In the case of a 28-foot trailer, the invention may increase cargo storage space by about 10%.

Yet another advantage is that the amount of cargo that can loadable/unloadable via forklift, clamp truck, pallet jack or other device is increased due to the ability of the platforms to raise cargo to a vertical level that is within reach.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
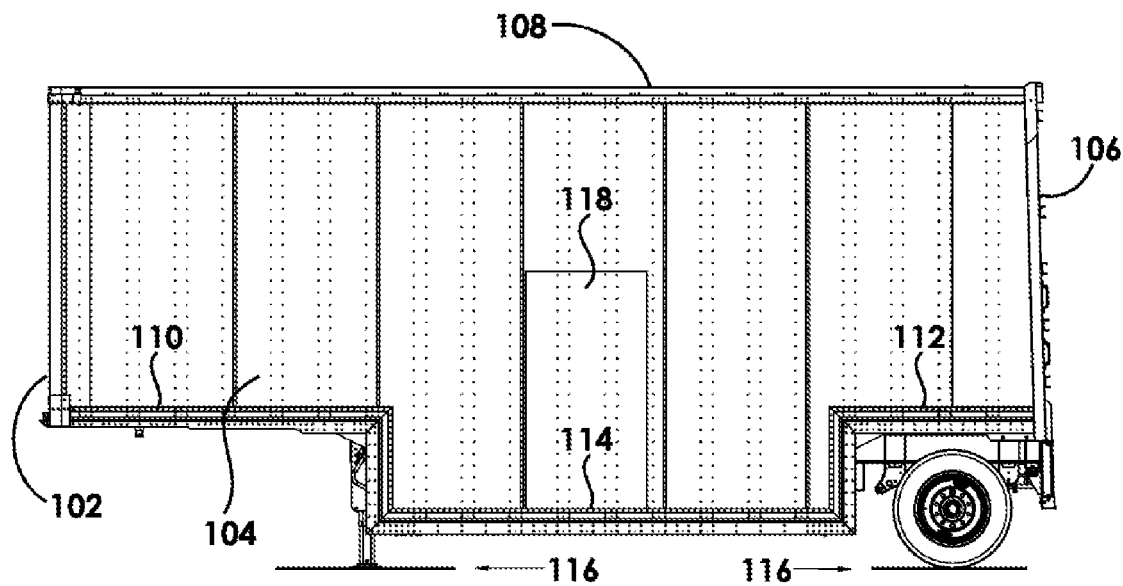
FIG. 1 is a side view of one embodiment of a trailer of the present invention.

Corresponding reference characters indicate corresponding parts throughout the several views. Although the drawings represent embodiments of the present invention, the drawings are not necessarily to scale, and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 illustrates a side view of one embodiment of a trailer 100 of the present invention. Trailer 100 includes a front wall 102, a left sidewall 104, one or two rear doors 106, a roof sheet 108, a forward main floor section 110, a rear main floor section 112, and a middle curb-level floor section 114. The space in trailer 100 above middle curb-level floor section 114 and below the vertical level of main floor sections 110, 112 may be referred to herein as the "belly" of trailer 100. Forward main floor section 110 and rear main floor section 112 may both be about 49 inches above a street level 116 to facilitate loading and unloading of trailer 100 from and onto a standard-height loading dock. Middle curb-level floor section 114 may be less than one foot, but no more than three feet above street level 116 to facilitate loading and unloading of trailer 100 from and onto a standard-height curb.

A door 118 may be provided in sidewall 104 or 136 above middle curb-level floor section 114. Cargo may be loaded into and out of the belly of trailer 100 at curb-height through door 118. Door 118 is shown in a closed position such that the belly and the remainder of the interior space of trailer 100 may be enclosed during transport. However, door 118 may be moved to an open position for loading cargo into and out of the belly of trailer 100. Door 118 may be different than as shown in FIG. 1 in terms of quantity, size, and location within the belly area.

Figure 1A:
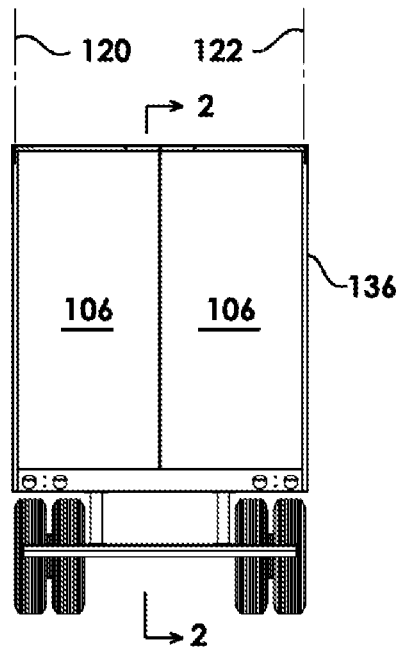
FIG. 1a is a rear view of the trailer of FIG. 1.

FIG. 1a is a rear view of trailer 100. Doors 106 may each swing open about a respective axis 120, 122. In another embodiment (not shown), the rear door may be an overhead type of door and will roll up and out of the way. Trailer 100 includes a right sidewall 136.

Figure 2:
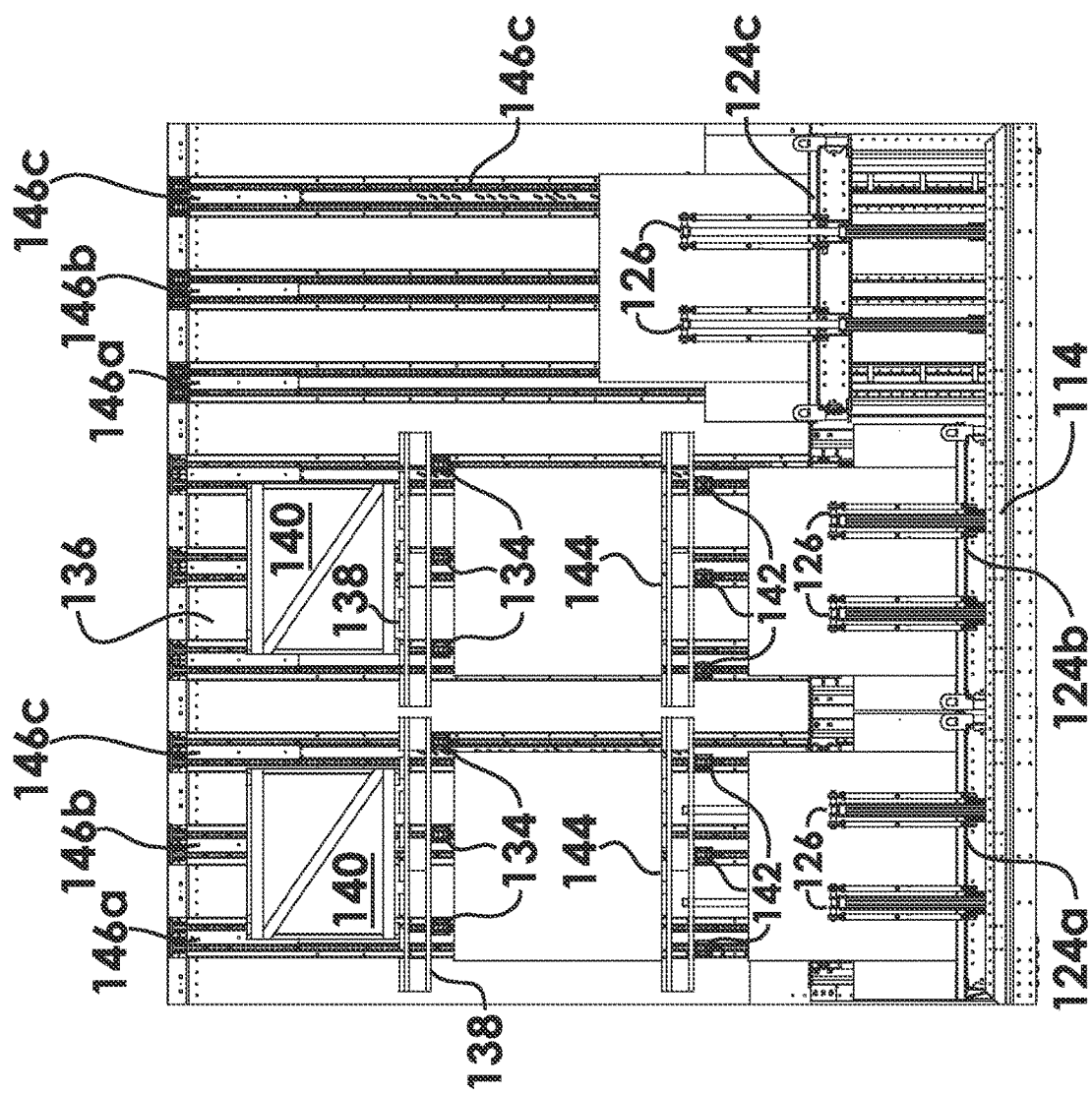
FIG. 2 is a fragmentary side sectional view of the trailer of FIG. 1a along line 2-2.

FIG. 2 illustrates the middle section of trailer 100 above middle curb-level floor section 114 along line 2-2 of FIG. 1a. Right sidewall 136 is visible in the background in FIG. 2. Immediately above middle curb-level floor section 114 are three elevator assemblies each including a respective one of liftable platforms 124a-c which are aligned from the front to the rear of the middle section of trailer 100. Each of platforms 124a-c may be individually raised or lowered by a respective set of four lifting devices 126. Only two lifting devices 126 are visible in FIG. 2 as being associated with each of platforms 124a-c on the left-hand side of each of platforms 124a-c. Lifting devices 126 may include electric, hydraulic, pneumatic and/or mechanical components, liquids and/or gasses.

Platforms 124a-b are shown in FIG. 2 in their lowermost positions wherein platforms 124a-b are closest to middle curb-level floor section 114. In contrast, platform 124c is raised by lifting devices 126 above middle curb-level floor section 114 to a vertical level that is 49 inches above street level 116 such that a top surface of platform 124c is at the same vertical level as the top surface of rear main floor section 112. Platform 124c may be secured at this raised vertical level by a locking mechanism.

Load bars 134 each have a left end latched onto left sidewall 104 and a right end latched onto an opposing right sidewall 136 such that load bars 134 may support freight or cargo 138, 140 at uppermost positions within trailer 100. Other load bars 142 each have a left end latched onto left sidewall 104 and a right end latched onto right sidewall 136 such that load bars 142 may support freight or cargo 144 at middle or intermediate vertical levels within trailer 100.

As shown in FIG. 2, right sidewall 136 has a respective set of three vertical posts 146a-c associated with and laterally adjacent each of platforms 124a-c.

Figure 3:
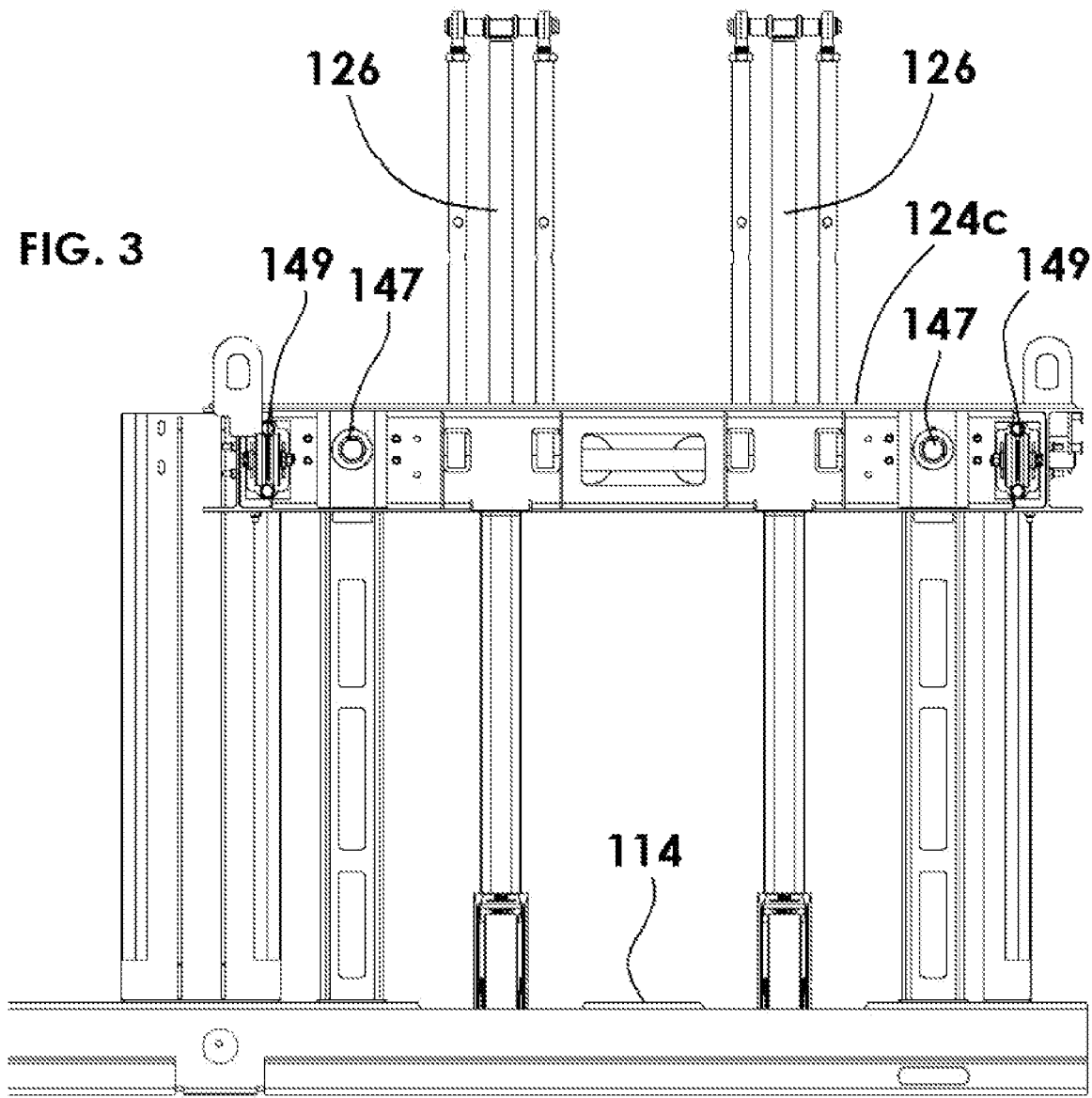
FIG. 3 is an enlarged side view of one of the platforms and associated lifting mechanisms of FIG. 2.

FIG. 3 illustrates platform 124c and associated platform lifting devices 126 in more detail. It is to be understood that these details may also apply to the other platforms 124a-b. Platform locking mechanisms 147 operate to lock platform 124c at the raised vertical level shown in FIGS. 2-3. Platform guide roller mechanisms 149 guide the movement of platform 124c in up and down vertical directions and help to maintain platform 124c in a horizontal orientation while in motion.

Figure 4:
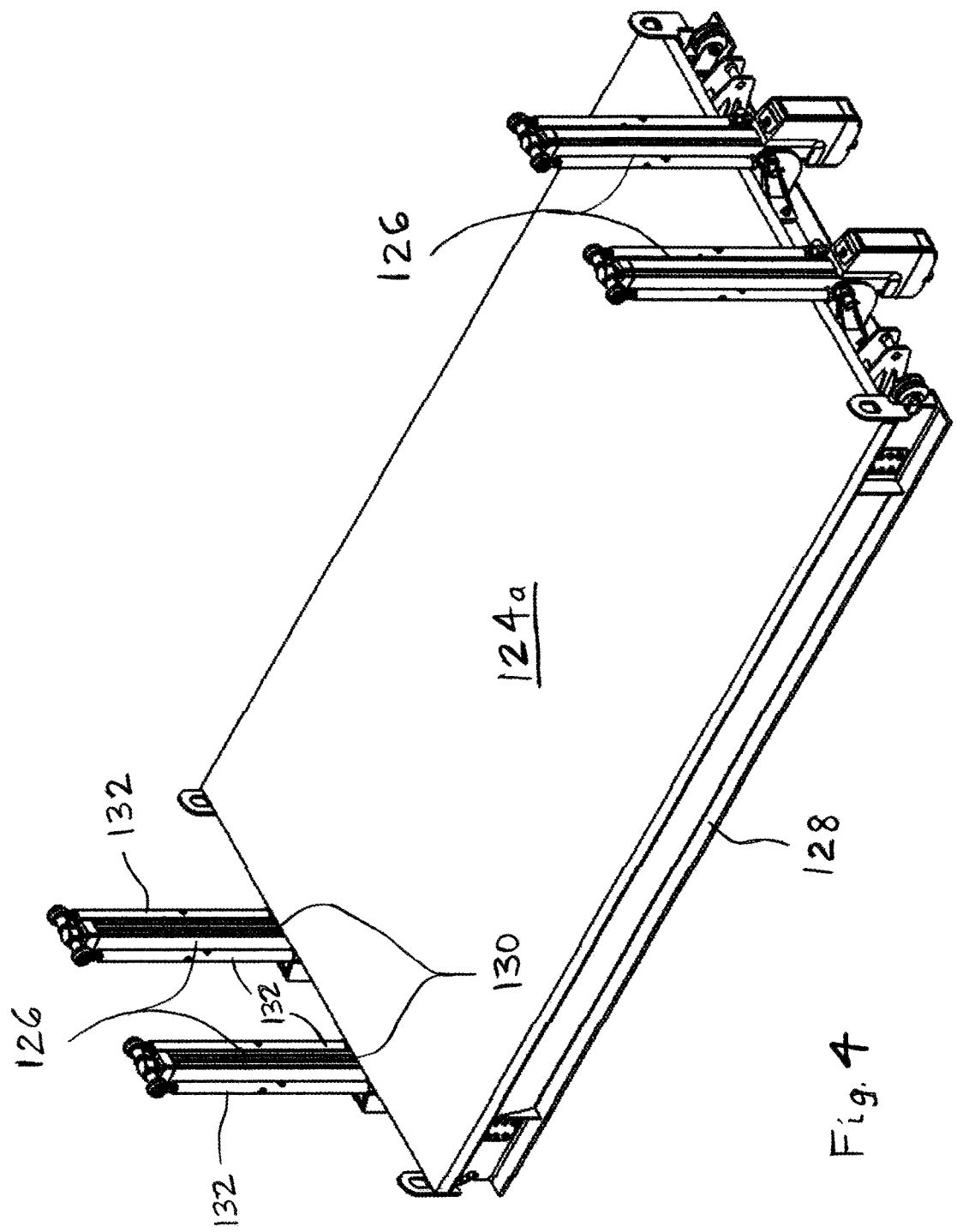
FIG. 4 is a perspective view of one of the elevator assemblies shown in FIG. 2.

FIG. 4 illustrates more completely the forwardmost one of the elevator assemblies shown in FIG. 2, and the other two elevator assemblies may be identical to the elevator assembly of FIG. 4. Platform 124a may be lifted and lowered by four lifting devices 126 which are all attached to the same curb-level floor section 114. Each lifting device 126 includes a stationary body 130 and vertically movable linkages 132. Platform 124a may be attached to movable linkages 132 such that platform 124a follows the up and down movements of movable linkages 132 within the belly of trailer 100.

Figure 5:
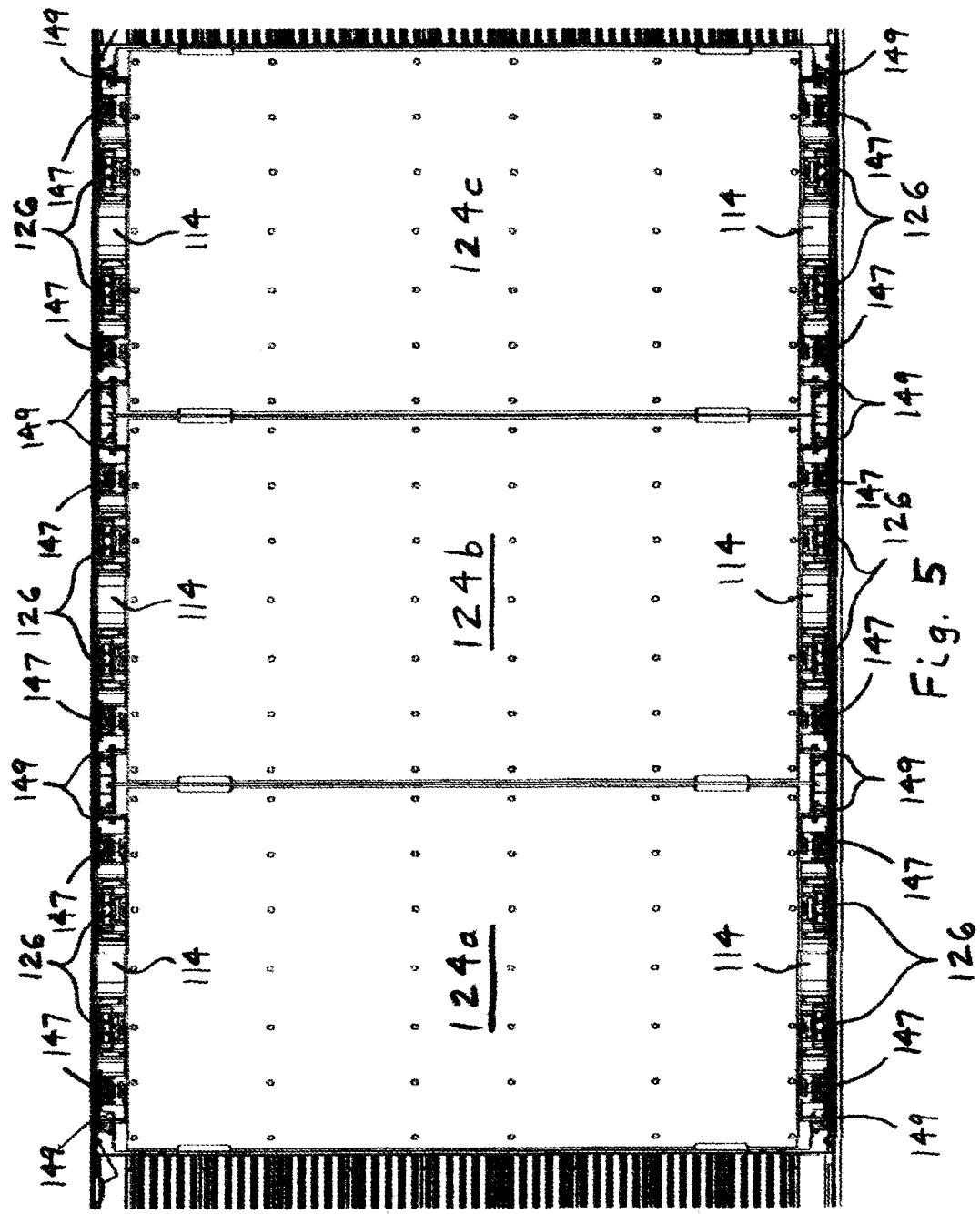
FIG. 5 is an overhead view of the three platforms and associated lifting mechanisms of FIG. 2.

FIG. 5 illustrates the three platforms 124a-c and associated lifting mechanisms 126 of FIG. 2. Also visible in FIG. 5 are platform locking mechanisms 147 and platform guide roller mechanisms 149. Middle curb-level floor section 114 is visible between the above-mentioned components.

Figure 6:
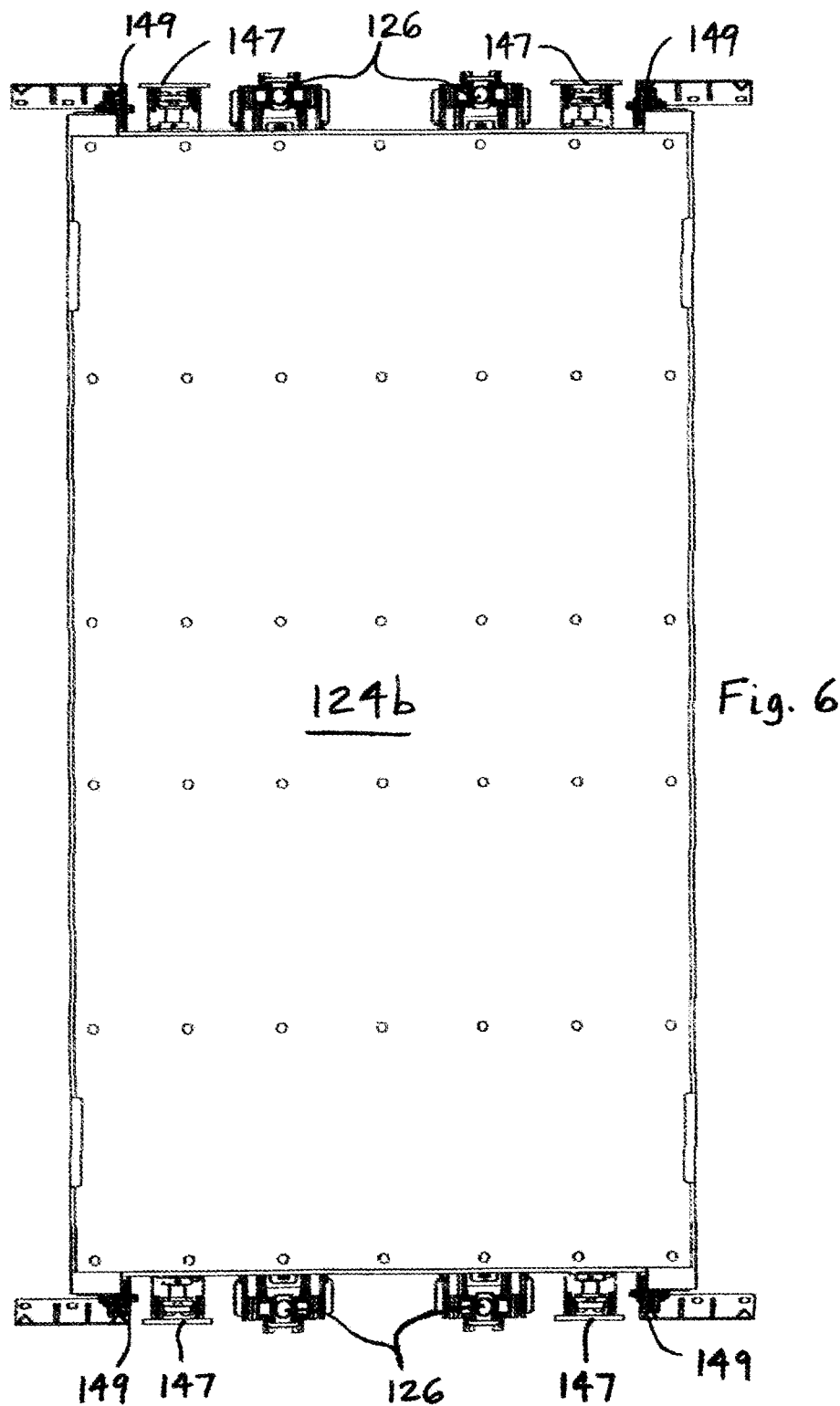
FIG. 6 is an overhead view of the middle platform and associated lifting mechanisms of FIG. 5.

FIG. 6 illustrates the middle platform 124b and associated lifting mechanisms 126 of FIG. 5. Also visible in FIG. 6 are platform locking mechanisms 147 and platform guide roller mechanisms 149.

Figure 7:
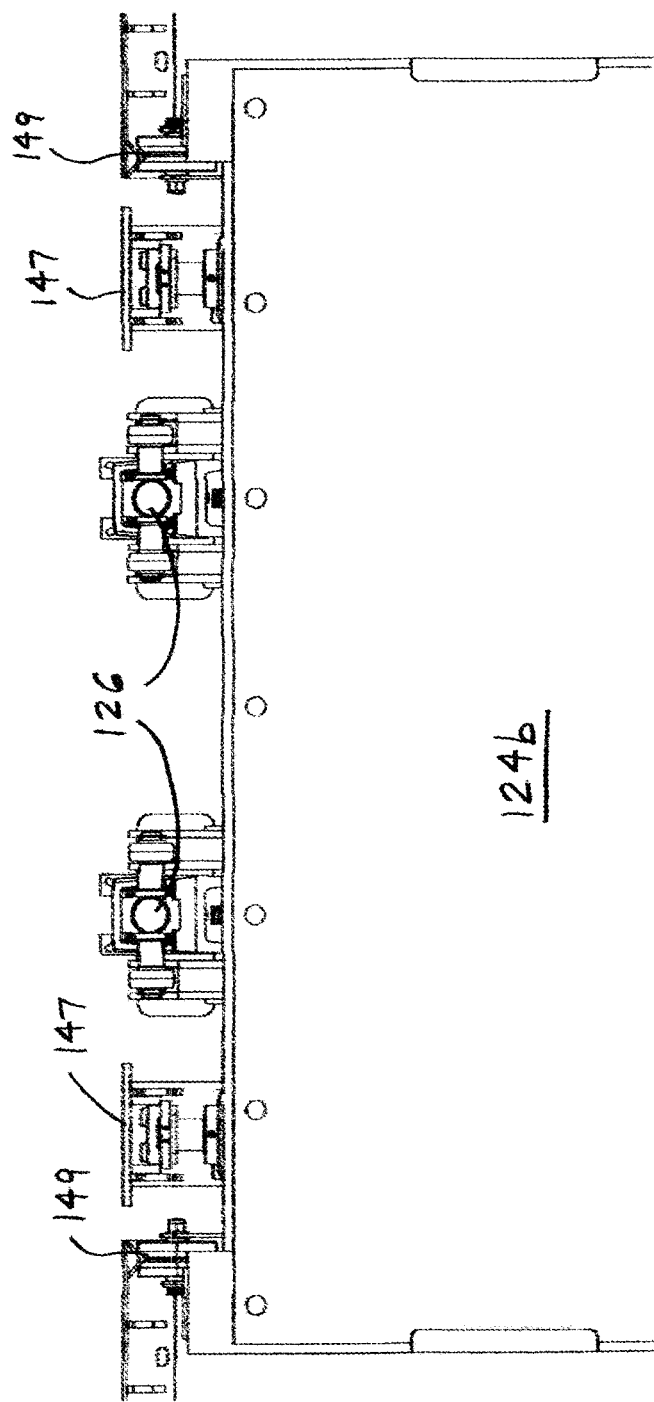
FIG. 7 is an enlarged overhead view of the righthand side of the middle platform and associated lifting mechanisms of FIG. 6.

FIG. 7 illustrates the righthand side of the middle platform 124b and associated lifting mechanisms 126 of FIG. 6. Also visible in FIG. 7 are platform locking mechanisms 147 and platform guide roller mechanisms 149.

The invention may be applied to a trailer, container or truck body. Trailers, containers or truck bodies may be conjunctively referred to herein as "transportation vessels".

A forklift, clamp truck, pallet jack or other loading/unloading device may be used to load or unload cargo that is supported by the platforms. Forklifts, clamp trucks, pallet jacks and other loading/unloading devices may be conjunctively referred to herein as "loading/unloading devices".

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A transportation vessel, comprising:
   a front section having a first floor with an upper surface at a fixed vertical level approximately between three and six feet above a street level;
   a middle section;
   a rear section having a second floor with an upper surface at the fixed vertical level;
   a horizontally-oriented platform disposed in the middle section;
   a lifting mechanism coupled to the platform and configured to selectively raise and lower the platform between a low vertical position of one to two feet above street level, otherwise known as curb-level, and a high vertical position of approximately between three and seven feet above street level;
   a locking mechanism configured to lock the platform in a vertical position; and,
   one or more load bars disposed in the middle section and coupled to the transportation vessel;
   wherein the lifting mechanism comprises an electric actuator; and
   wherein the one or more load bars support cargo at one or more vertical positions above the platform.

2. The transportation vessel of claim 1 wherein the platform, the first floor, and the second floor form a substantially flat, continuous surface for supporting a loading/unloading device being driven thereon when the platform is in the high vertical position.

3. The transportation vessel of claim 1 wherein the platform cannot be lowered below the low vertical position, and the platform can be raised above the high vertical position.

4. The transportation vessel of claim 1 wherein the lifting mechanism is configured to raise, and lower cargo supported by the platform to a plurality of different vertical levels at which the cargo may be unloaded by a loading/unloading device supported by the first floor or the second floor, the volumetric capacity of the vessel being increased by the lifting mechanism lowering the platform.

5. The transportation vessel of claim 1 wherein the locking mechanism is configured to lock the platform in the high vertical position.

6. The transportation vessel of claim 1 wherein the platform cannot be lowered below the low vertical position, and the platform cannot be raised above the high vertical position.

7. The transportation vessel of claim 1 wherein the front section, the middle section and the rear section are aligned with each other along a longitudinal direction from a front to a rear of the transportation vessel.

8. The transportation vessel of claim 1 wherein the middle section is disposed between the front section, and the rear section.

9. A transportation vessel, comprising:
   a front section having a first floor with an upper surface at a first vertical level approximately between three and six feet above a street level;
   a middle section;
   a rear section having a second floor with an upper surface at the first vertical level approximately between three and six feet above a street level;
   a plurality of horizontally-oriented platforms disposed in the middle section;
   a plurality of lifting mechanisms, each said lifting mechanism being coupled to a respective one of the platforms and configured to selectively raise and lower the respective platform between a low vertical position of one to two feet above street level, otherwise known as curb-level, and a high vertical position of approximately between three and seven feet above street level;
   a plurality of locking mechanisms each configured to lock a respective one of the platforms in a vertical position; and,
   one or more load bars disposed in the middle section and coupled to the transportation vessel;
   wherein the lifting mechanisms comprise electric actuators; and
   wherein the one or more load bars support cargo at one or more vertical positions above the platforms.

10. The transportation vessel of claim 9 wherein a bottom of the platform is less than eighteen inches above the street level when the platform is in the low vertical position, and a top of the platform is at the first vertical level when the platform is in the high vertical position.

11. The transportation vessel of claim 9 wherein the platforms are aligned with each other along a longitudinal direction from a front to a rear of the transportation vessel.

12. The transportation vessel of claim 9 wherein the lifting mechanisms are individually and separately operable such that each of the platforms may be at a different respective vertical level at a same single point in time.

13. The transportation vessel of claim 9 wherein the platforms, the first floor, and/or the second floor form a substantially flat, continuous surface for supporting a loading/unloading device being driven thereon when the platforms are each in the high vertical position.

14. The transportation vessel of claim 9 wherein the platforms cannot be lowered below the low vertical position, and the platforms can be raised above the high vertical position.

15. The transportation vessel of claim 9 wherein the lifting mechanisms include screws, liquids and/or gasses.

16. The transportation vessel of claim 9 wherein the plurality of locking mechanisms are each configured to lock a respective one of the platforms in the high vertical position.

17. The transportation vessel of claim 9 wherein the platforms cannot be loweree below the low vertical position, and the platforms cannot be raised above the high vertical position.

18. A transportation vessel, comprising:
    a front section having a first floor with an upper surface approximately at a fixed vertical level between three and six feet above a street level;
    a middle section;
    a rear section having a second floor with an upper surface at the fixed vertical level approximately between three and six feet above a street level;
    a plurality of horizontally-oriented platforms disposed in the middle section;
    a plurality of lifting mechanisms, each said lifting mechanism being coupled to a respective one of the platforms and configured to selectively raise and lower the respective platform between a low vertical position and a high vertical position, a bottom of each of the platforms being less than two feet above the street level when the platform is in the low vertical position, and a top of each of the platforms being at the fixed vertical level when the platform is in the high vertical position;
    a plurality of locking mechanisms each configured to lock a respective one of the platforms in a vertical position; and,
    one or more load bars disposed in the middle section and coupled to the transportation vessel;
    wherein the lifting mechanisms comprise electric actuators; and
    wherein the one or more load bars support cargo at one or more vertical positions above the platforms.

19. The transportation vessel of claim 18 wherein a bottom of each said platform is less than eighteen inches above the street level when the platform is in the low vertical position, the lifting mechanisms each being configured to selectively raise the respective platform above the high vertical position.

20. The transportation vessel of claim 18 wherein the platforms, the first floor, and/or the third floor form a substantially flat, continuous surface for supporting a loading/unloading device being driven thereon when the platforms are each in the high vertical position.

* * * * *